United States Patent
Kyttanen et al.

(10) Patent No.: US 10,391,681 B2
(45) Date of Patent: Aug. 27, 2019

(54) MOULDING PROCESS

(71) Applicant: PIXSWEET B.V., Utrecht (NL)

(72) Inventors: Janne Tuomas Kyttanen, Utrecht (NL); Eduard Willem Zanen, Utrecht (NL)

(73) Assignee: PIXSWEET B.V. (NL)

( * ) Notice: Subject to any disclaimer, the term of this patent is extended or adjusted under 35 U.S.C. 154(b) by 0 days.

(21) Appl. No.: 15/572,053

(22) PCT Filed: Jan. 19, 2017

(86) PCT No.: PCT/EP2017/051075
§ 371 (c)(1),
(2) Date: Nov. 6, 2017

(87) PCT Pub. No.: WO2017/125488
PCT Pub. Date: Jul. 27, 2017

(65) Prior Publication Data
US 2018/0085972 A1     Mar. 29, 2018

(30) Foreign Application Priority Data
Jan. 19, 2016 (GB) .................................. 1600946.6

(51) Int. Cl.
*B29C 39/10* (2006.01)
*B29C 33/38* (2006.01)
(Continued)

(52) U.S. Cl.
CPC .......... *B29C 33/3842* (2013.01); *A21D 13/47* (2017.01); *A23G 1/507* (2013.01);
(Continued)

(58) Field of Classification Search
None
See application file for complete search history.

(56) References Cited

U.S. PATENT DOCUMENTS 2,176,409 A  * 10/1939 Moroni Peterson ..... A23G 9/04
                                                       426/279
2,843,493 A  *  7/1958 Sharples .................. A23G 9/20
                                                       426/421
(Continued)

FOREIGN PATENT DOCUMENTS

| FR | 2978330 | * | 2/2013 |
| GB | 2135437 A | | 8/1984 |
| WO | 2005025779 A2 | | 3/2005 |

OTHER PUBLICATIONS

International Search Report & Written Opinion for PCT/EP2017/051075; dated Apr. 19, 2017; 13 pgs.

*Primary Examiner* — Edmund H Lee
(74) *Attorney, Agent, or Firm* — Gardner Groff & Greenwald, PC (57) ABSTRACT

The invention is directed to a method of forming a molded item said method comprising the steps of (a) providing a mold former comprising an indentation having an inner surface and a bottom face and made of plastics and manufactured by a 3-dimensional printing process, said mold former being shaped to form a mold having (i) an indentation corresponding to the desired shape of said molded item; and (ii) a series of holes extending between the inner surface and the bottom face of the mold former, (b) forming a mold in said mold former from a plastics material; (c) positioning an elongate member in said mold; (d) introducing a volume of liquid into said indentation; (e) positioning a cover over said mold and sealing it thereto; (f) causing said liquid to solidify.

18 Claims, 5 Drawing Sheets

(51) Int. Cl.
  *A23G 9/22*   (2006.01)
  *A23G 9/26*   (2006.01)
  *A23G 9/50*   (2006.01)
  *A23G 1/50*   (2006.01)
  *A23G 3/56*   (2006.01)
  *B29C 67/24*   (2006.01)
  *C11C 5/02*   (2006.01)
  *A21D 13/47*   (2017.01)
  *B33Y 10/00*   (2015.01)
  *B33Y 80/00*   (2015.01)
  *B29L 31/00*   (2006.01)
  *B29C 33/00*   (2006.01)
  *B29C 51/30*   (2006.01)
  *B29C 64/118*   (2017.01)

(52) U.S. Cl.
  CPC ............ *A23G 3/566* (2013.01); *A23G 9/221* (2013.01); *A23G 9/26* (2013.01); *A23G 9/503* (2013.01); *A23G 9/506* (2013.01); *B29C 33/3814* (2013.01); *B29C 33/3857* (2013.01); *B29C 39/10* (2013.01); *B29C 67/241* (2013.01); *B33Y 10/00* (2014.12); *B33Y 80/00* (2014.12); *C11C 5/023* (2013.01); *A23V 2002/00* (2013.01); *B29C 33/0011* (2013.01); *B29C 51/30* (2013.01); *B29C 64/118* (2017.08); *B29K 2855/02* (2013.01); *B29L 2031/758* (2013.01)

(56) References Cited

U.S. PATENT DOCUMENTS

| | | | | |
|---|---|---|---|---|
| 2,955,044 | A * | 10/1960 | Tupper | A23G 9/221 206/526 |
| 4,001,440 | A | 1/1977 | Hoyt | |
| 9,844,904 | B2 * | 12/2017 | Hackett, Jr. | B33Y 80/00 |
| 2007/0029698 | A1 * | 2/2007 | Rynerson | B22F 3/1055 264/219 |
| 2007/0122521 | A1 * | 5/2007 | Degady | A23G 4/00 426/5 |
| 2010/0023155 | A1 * | 1/2010 | Conrad | B29C 33/3835 700/119 |
| 2015/0231818 | A1 * | 8/2015 | Hackett, Jr. | B33Y 80/00 428/36.92 |

* cited by examiner

MOULDING PROCESS

FIELD OF THE INVENTION

The invention relates to methods for producing moulded items, including confections and frozen confections, candles and other decorative consumer items. The invention particularly relates to methods for producing relatively small numbers of such items in a bespoke fashion, in response to consumer requests.

BACKGROUND AND PRIOR ART

Moulded items are very popular in a number of consumer markets. In the food arena, confections such as chocolate-based confections are often produced in novelty shapes, such as in the shape of trees or animals. Also, frozen confections such as frozen fruit composites (often known as "ice pops" or "ice lollies") or ice-cream are also produced in novelty shapes. In both of these contexts, and especially so in the case of frozen confections, it is common to include a stick, in the form of an rigid elongate member, in the product to allow a consumer to hold the item by the stick, rather than touching the food item itself.

Moulded items are also popular in other consumer markets, such as candles and decorative plaques. These often also include elongate members protruding from the moulded shapes, e.g. in the form of a wick for candles, or a fixing device for decorative plaques.

The production of these items usually involves complex tooling of moulds that are carefully designed and machined in metal to provide a long-lasting and durable mould that can be used on a production line for many years. In a typical production process, a number of such moulds would be made, and used side-by-side, to optimise the throughput of the manufacturing facility. The moulds are typically arranged such that the elongate members (e.g. lolly stick, wick or fixing device) protrude from the top of the mould, with the moulding fluid added around the elongate member prior to solidification. The moulded item is then removed from the mould, and transferred to separate packaging material for onward despatch to a retailer, and thence to the ultimate consumer.

The production of the moulds for such a process is time-consuming and expensive, and as a result, is only commercially viable for a design that is long-lived, or is sold in very large numbers. It is thus difficult to meet consumer demand for more bespoke shapes that might only be required in relatively small numbers. Applicants believe that they are the first to contemplate to manufacture such items having a bespoke shape in relatively small numbers in a simple and high throughput process. It is amongst the objects of the present invention to attempt a solution to this problem.

SUMMARY OF THE INVENTION

Accordingly, the invention provides a method of forming a moulded item said method comprising the steps of:

(a) providing a mould former comprising an indentation having an inner surface and a bottom face and made of plastics and manufactured by a 3-dimensional printing process, said mould former being shaped to form a mould having:

(i) an indentation corresponding to the desired shape of said moulded item; and (ii) a series of holes extending between the inner surface and the bottom face of the mould former, (b) forming a mould in said mould former from a plastics material;

(c) positioning an elongate member in said mould such that one end of the elongate member lies within said indentation and the other end of said member lies outside said indentation;

(d) introducing a volume of liquid into said indentation;

(e) positioning a cover over said mould and sealing it thereto;

(f) causing said liquid to solidify.

Applicants found that by making use of 3-dimensional printing it is possible to make plastic mould formers having a bespoke shape in small numbers. A skilled person would not have readily contemplated using plastic mould formers because of their low heat conductivity. This would typically have resulted in a very low production speed when series of moulds are prepared. After each step (b) the mould former would required to be cooled down before a next mould can be made. Because of the low heat conductivity such cooling would require too much time. Applicants have now found that by providing holes through which hot air can escape during the forming process resulting in enhancing the cooling of the mould form. Suh holes can be simply made in the 3-dimensional printing process.

In any such method, it is further preferred that, in step (b) said mould is formed by vacuum forming a sheet plastics material.

In step (e) said cover preferably comprises a plastics film, and more preferably said cover further comprises a metal foil.

Where a plastics material is used for the cover, it preferable that in step (e) said cover is sealed to said mould by plastics welding.

In any method of the invention, it is preferred that said cover is sealed to said mould adjacent the periphery of said indentation.

In any method of the invention, it is preferred that in step (f) said liquid is caused to solidify by means of a phase change. In the manufacture of frozen confections, this would entail a freezing stage. In the manufacture of candles, hot wax would be used as the liquid, solidifying at room temperature to produce a solid candle.

In preferred methods of the invention, in step (f) said liquid is caused to solidify by means of a cooking process. In this way, moulded items such as cakes or biscuits may be made by the method.

In preferred methods of the invention, in step (f) said liquid is caused to solidify by means of a polymerisation reaction. In the manufacture of decorative items, such as plaques, keyrings and other 3-D novelty items, the liquid could comprise a monomer that is caused to solidify by the addition of an initiator, such as a free-radical initiator or photo-initiator.

In any method of the invention it is preferred that said elongate member is edible. As well as creating a more desirable product, this also reduces the need for the end consumer to dispose of waste materials.

Also in preferred embodiments, where a candle is to be produced, said elongate member is a wick.

Where the moulded item is a frozen confection it is preferred that in step (f) said liquid is caused to solidify by means of freezing.

Where said moulded item is a confection and wherein said liquid comprises molten chocolate, it is preferred that in step (f) said liquid is caused to solidify by means of cooling.

Where said elongate member is edible, it is preferred that said elongate member is formed of biscuit or hard candy.

Where said moulded item consists of a bakery product, and said solidification takes place by cooking, it is preferred that said liquid comprises a cake or dough mix. In this case, it is also preferred that said elongate member is formed of biscuit or hard candy.

Where said solidification takes place by a phase change, it is preferred that said liquid comprises molten candle wax and said elongate member comprises a wick.

In any method of the invention said mould former is made of plastics and manufactured by a 3-dimensional printing process. This significantly reduces the lead time, and cost, for producing such a mould, which can then be readily recycled after use. Suitably the 3-dimensional printing process is performed by means of fused deposition modelling (FDM) or fused filament fabrication (FFF). The plastic may be any plastic suited for such printing processes. Preferably the mould former is made of acrylonitrile-butadiene-styrene (ABS).

Also included within the scope of the invention is a method of manufacturing a moulded item comprising the steps of: (i) receiving a data file representing a 3-dimensional object; (ii) using said data file in a 3-dimensional printing process in which said data file is used to define the shape of the mould indentation in the manufacture of said mould former.

In such a method, it is preferred that the method comprises a further step in which the data in said data file is amended after receipt to remove undercuts in the shape of the mould indentation.

Also included within the scope of the invention is a method of manufacturing a moulded item substantially as described herein with reference to any combination of the accompanying drawings.

Also included within the scope of the invention is a moulded item manufactured by a method described herein.

Also included within the scope of the invention is a process to prepare a mould suited to hold a moulded item by
(a) providing a mould former comprising an indentation having an inner surface and a bottom face and made of plastics and manufactured by a 3-dimensional printing process, said mould former being shaped to form a mould having:
 (i) an indentation corresponding to the desired shape of said moulded item; and
 (ii) a series of holes extending between the inner surface and the bottom face of the mould former,
(b) forming a mould in said mould former from a plastics material.

Also included within the scope of the invention is a mould former suited to prepare a mould which in turn is suited to hold a moulded item comprising an indentation having an inner surface and a bottom face and made of plastics and manufactured by a 3-dimensional printing process, said mould former being shaped to form a mould having:
 (i) an indentation corresponding to the desired shape of said moulded item; and
 (ii) a series of holes extending between the inner surface and the bottom face of the mould former.

BRIEF DESCRIPTION OF THE FIGURES

The invention will be described with reference to the accompanying drawings, in which.

DESCRIPTION OF PREFERRED EMBODIMENTS

Figure 1:
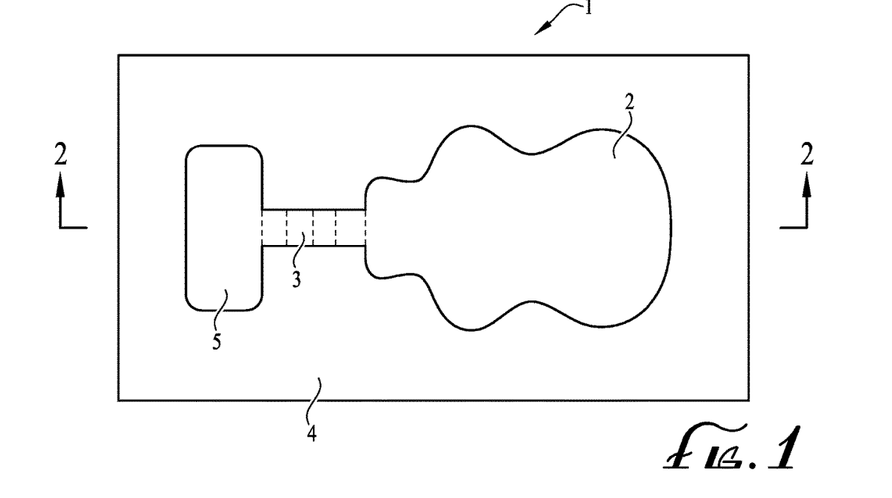
FIG. 1 illustrates a plan view of a mould used in the invention.
Figure 2:
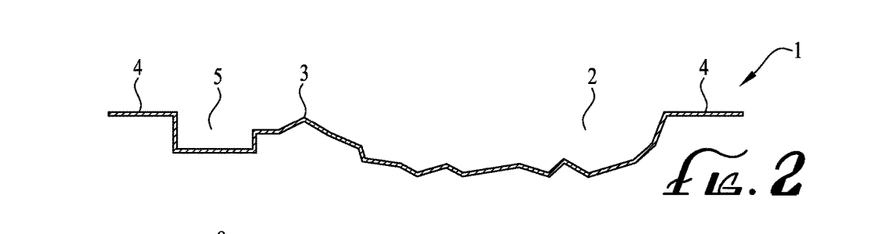
FIG. 2 illustrates a cross-section of the mould of FIG. 1, along line A-A.

FIGS. 1 and 2 illustrate, in plan and cross-sectional view respectively, a mould for use in a method of the present invention, generally indicated by 1. The mould 1 has an indentation 2 corresponding to the desired shape of a moulded item to be made. Adjacent one edge of the indentation 2 is a weir 3 that has a height at, or just below the height of the surrounding plane 4 of the mould. In particularly preferred embodiments, the height difference between the top of the weir 3 and the top surface 4 of the mould is approximately the same as the thickness of the elongate member 12 described below. In the embodiment illustrated, the mould further comprises a second indentation 5 adjacent the weir 4, but on the other side to the indentation 2. In some embodiments, the second indentation 5 is not used, but its function will be described below.

Figure 3:
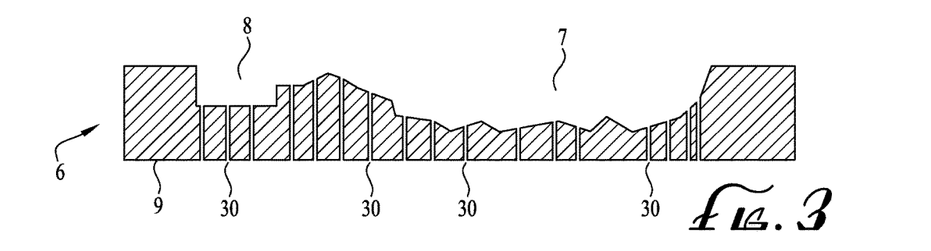
FIGS. 3 and 4 illustrate cross-sectional views of a mould former.
Figure 4:
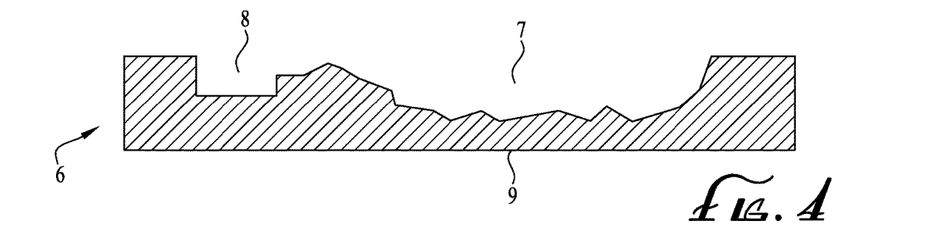

FIGS. 3 and 4 illustrate, in cross-section, a mould former 6 for use in a method of the invention. The mould former 6 is shaped to include indentations 7 and 8 (if required) corresponding to the desired shape of the indentation 2 and indentation 5 of the mould 1 illustrated in FIGS. 1 and 2. In the mould former of FIG. 3, a series of holes 30 are included in the mould former, extending between the inner surface of each indentation 7, 8 and the bottom face 9 of the mould. These holes are typically less than 2 mm in diameter, and preferably less than 1 mm in diameter, and serve to improve the quality of vacuum formed moulds 1 by allowing air to escape through the mould during the forming process. In other embodiments, the mould former 6 may be produced of a gas-porous material, such as of sintered construction or a rigid open cell foam.

To form a mould 1 a sheet of thermoplastic material is placed over the mould former and a pressure differential created either side of sheet material while the material is heated above its softening point. The pressure differential is typically created by use of a vacuum below the sheet with heating carried out by an infra-red source. The mould forming process is well-known in the art as vacuum forming. Particularly preferred materials for forming the moulds 1 are sheet polymeric materials, such as those made from polyester, polyolefin, polypropylene and polyamide. Especially preferred are co-extruded sheets of amorphous polyester and polyolefin, such as that sold under the Registered Trademark MP 300 (Wipak, Poland). The sheet materials preferably have a thickness of less than 2 mm, more preferably less than 1 mm.

Figure 5:
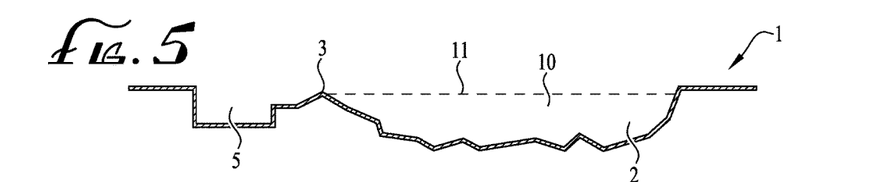
FIG. 5 illustrates a cross-sectional view of a mould containing liquid.
Figure 6:
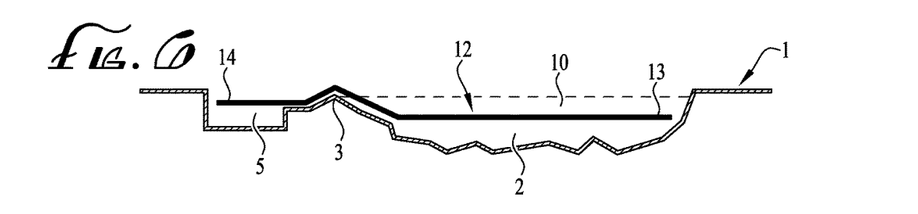
FIG. 6 illustrates a cross-sectional view of a mould containing liquid and an elongate member.
Figure 7:
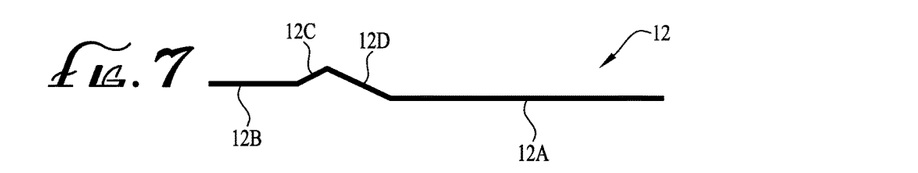
FIG. 7 illustrates an elevation view of an elongate member.

FIGS. 5-7 illustrate the filling stages of the method of the present invention. In FIG. 5, a liquid 10, which will form the moulded item after solidification, is introduced into the indentation 2 to a level 11, at or below the height of the weir 3. In FIG. 6, an elongate member 12 is positioned in the mould such that one end of the member 13 lies within the indentation 2, and the other end 14 lies outside the indentation 2, thereby crossing the weir 3. It will be appreciated that the volume of liquid 10 added to the indentation 2 is such that it does not spill over the weir 3 once the elongate member 12 is in place.

The shape of the elongate member in this embodiment is appropriate when producing a confection or an frozen confection. The elongate member in this instance will often be referred to as a "stick". The stick is likely to be made of a rigid material, e.g. wood or plastics, but could also be formed of an edible material such as hard candy. The stick 12 is illustrated in isolation in FIG. 7, and is so shaped as to have a first portion 12A that is essentially planar, and is destined to lie within the indentation 2; a second essentially planar portion 12B destined to lie within the indentation 5, and lying parallel to, or even coplanar with the first portion 12A. Portions 12A and 12B are joined by portions 12C and 12D, these portions being so shaped as to allow the stick to cross the weir 3 of the mould 1. It will be appreciated that, although the stick is described as having several portions, it can readily be manufactured as a single-piece construction, e.g. by the use of injection moulding, if the stick is to be made of plastics.

The function of the second indentation 5 in the mould 1 is to facilitate the end user gripping the end of the elongate member 12 when the moulded item 21 is eventually removed from the mould.

Figure 8:
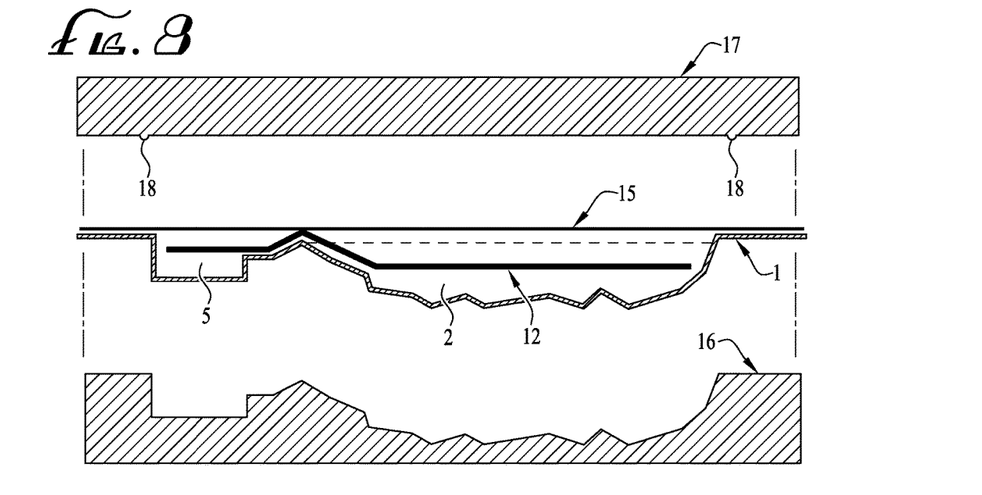
FIG. 8 illustrates the sealing stage of the method of the invention.

FIG. 8 illustrates the stage of sealing the moulded item (either before or after solidification). Like elements described above are numbered accordingly. A cover 15, in the form of a sheet of material is positioned over the top surface of the mould 1, filled with its contents and elongate member 12 (such as a stick). During this operation, the filled mould is preferably supported by a support member 16 having a shape corresponding to that of the mould, in order to allow the sealing operation to take place. A sealing member 17 is also provided, and may have a raised ridge 18 in a shape corresponding to the periphery of the indentaion 2, the indentation 5, and the connecting weir portion 3. In FIG. 8, these elements are shown in a spaced-apart configuration, for clarity. The sealing member is brought into contact with the cover 15, with the cover and mould being tightly sandwiched between the sealing member 17 and the support member 16. The cover 15 is then sealed onto the top surface of the mould. This may be carried out by a number of means, such as by the use of an adhesive positioned around the periphery of the indentations, or by ultrasonic welding. The most preferred method, however, is by plastics welding, using the application of heat along the line of the ridge 18. It is particularly preferred that the cover 15 is made of a plastic film, e.g. one made from polyester, especially biaxilally-orientated polyester such as the one sold under the registered trademark BIAXER (Wipak, Poland). It is further preferred that such film is metallised, e.g. with Aluminium.

Figure 9:
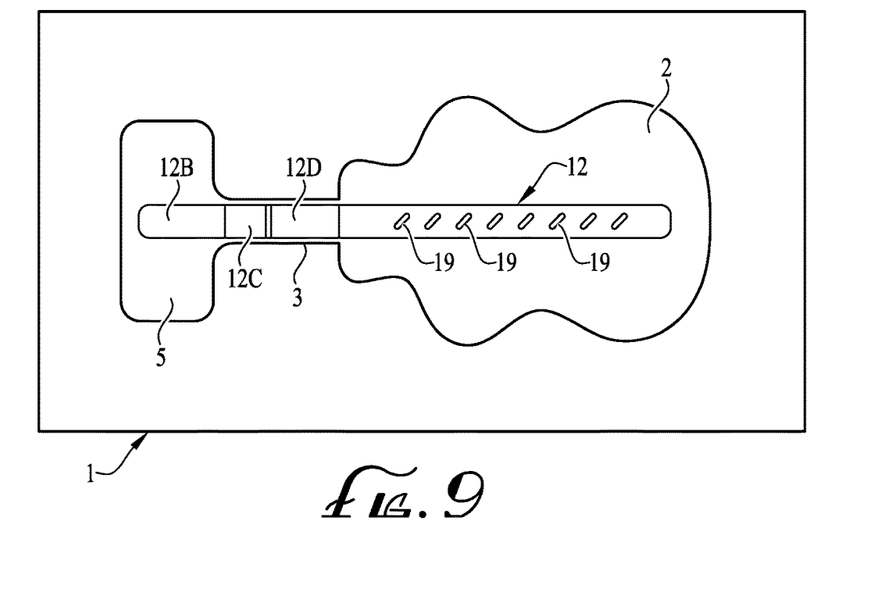
FIGS. 9 and 10 illustrate plan views of an elongate member in position in a mould.

FIG. 9 illustrates, in plan view, a mould 1, with an elongate member 12 of the form illustrated in FIG. 7 in position in the mould. It can be seen that it is preferred that the elongate member 12 is provided with indentations 19, or preferably through-holes 19 extending through its thickness. This provides extra grip between the elongate member and the liquid after solidification.

Figure 10:
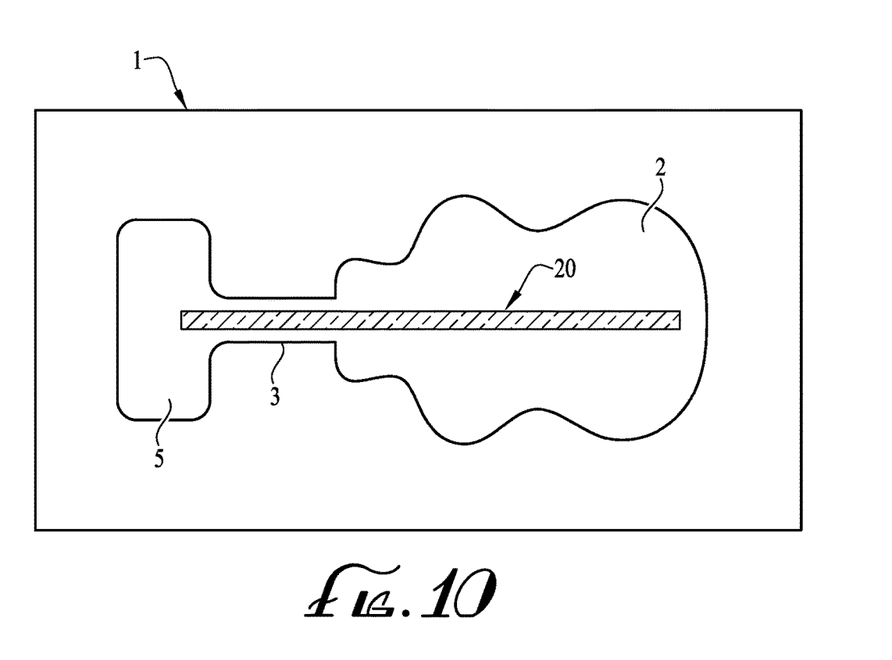

FIG. 10 illustrates an alternative embodiment that might be used to produce e.g. a moulded candle. FIG. 10 illustrates a plan view of the mould 1, and in this embodiment, the elongate member 12 comprises a wick 20. The flexibility of the wick 20 allows it to drape over the weir section 3, from the indentation 1 and extend into a second indentation 5 if desired.

Figure 11:
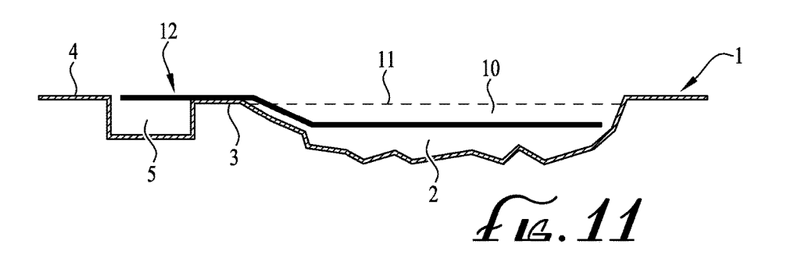
FIG. 11 illustrates a cross-sectional view of a mould containing liquid and an alternative elongate member.

FIG. 11 illustrates a further embodiment of the invention using a differently-configured elongate member 12, in the form of a rigid stick. Like elements described above are numbered accordingly. The stick 12 is illustrated in elevation view in isolation in FIG. 12.

Figure 12:
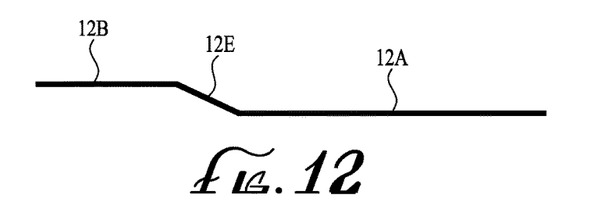
FIG. 12 illustrates an elevation view of an alternative elongate member.

Referring to FIGS. 11 and 12, it can be seen that in this embodiment, the stick 12 has a generally planar portion 12A destined to lie within the indentation 2 of the mould 1 and a second portion 12B destined to lie outside of the indentation 2. These two portions are connected by a single angled portion 12E, allowing the stick 12 to cross over the weir portion 3 of the mould, but leaving portion 12B lying on top of the top face 4 of the mould 1. Again, the stick 12 may be formed as a one-piece construction.

Figure 13:
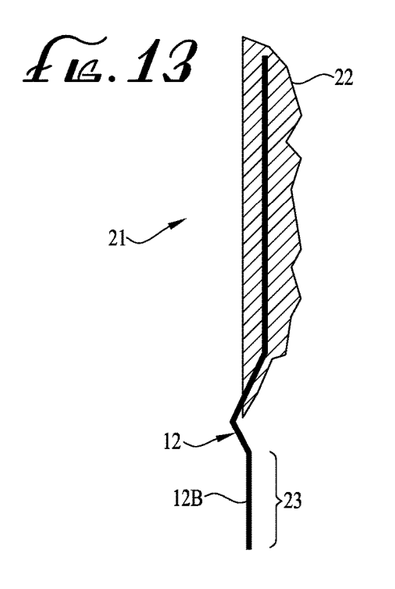
FIGS. 13 and 14 illustrate moulded items of the invention.
Figure 14:
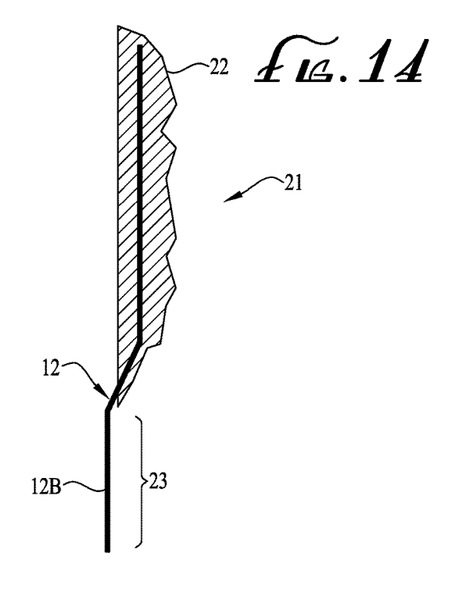

This configuration of stick 12 has a particular advantage over the one illustrated in FIG. 7, as illustrated in FIGS. 13 and 14. These figures show, in side elevation view, a moulded item of the invention generally indicated by 21. The solidified material 22 has been removed from the mould land has taken on the desired shape. FIG. 13 illustrates the use of a stick 12 of the form illustrated in FIG. 7, while FIG. 14 illustrates the use of a stick 12 as illustrated in FIG. 12. It can be seen that the part of the stick available for ready use by a consumer to hold the item (essentially portion 12B of the stick 12), and indicated by 23, is larger for the stick of FIG. 14, for an otherwise equal length of product.

Figure 15:
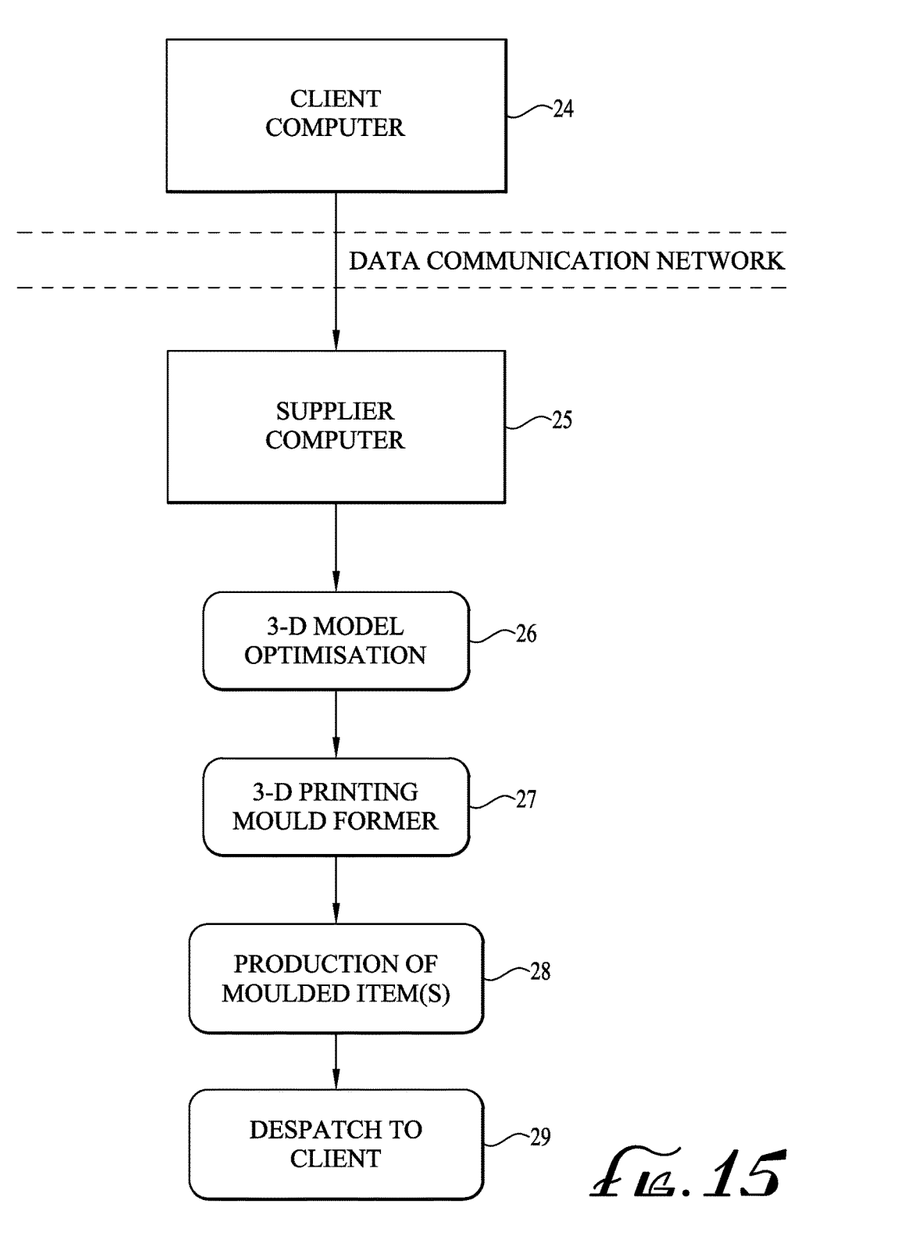
FIG. 15 illustrate, in flowchart form, a method of the invention.

FIG. 15 illustrates, by means of a flowchart, the operation of a particularly preferred method of the invention. This method allows a client located at their computer 24 to transmit data via a data communication network to a computer under control of a supplier of moulded items 25. The client computer could be a traditional desktop computer, a laptop, or tablet, or a mobile device such as a smart-phone, and preferably remote from the supplier's computer. The data transmitted across the network is a representation of the shape of the moulded object desired by the client. This could be in the form of a photograph or other 2-dimensional graphic to be interpreted by the manufacturer to form a 3-D model, or a digital representation of a 3-D model itself. The data communication network would typically be the Internet.

The supplier receives the data, which is then prepared for making the mould former used in the method. A stage of 3-D model optimisation 26 may be included in the process, the optimisation optionally including a number of steps:

i) Transformation of a 2-D representation of an object into a 3-D model. This could be carried out automatically with image processing software, or could include or consist of input from a human operative.

ii) Removal of undercuts in a 3-D model so produced, or received by the supplier, to ensure that the moulded object can be readily removed from the mould after solidification.

iii) Removal of unwanted or unnecessary background information or image content that might otherwise lead to unwanted material at the edges of the final moulded object 21.

iv) Scaling of the 3-D model, either maintaining the aspect ratio in all three dimensions, or selectively scaling one or two dimensions such the mould-former 6 produces moulds 1 that may be accommodated in the moulding apparatus and/or produces a desired mould volume.

Following optimisation of the 3-D model, a mould former 6 is created by the use of 3-D printing 27. A number of 3-D printing technologies will be available to the skilled addressee, printing in a range of materials including plaster (e.g. with the 3-D printer sold under the Registered Trademark "ProJet® 660 Pro" by 3D systems Inc., USA), thermoplastics, photopolymerised polymers, or thermally-sintered materials. In particularly preferred embodiments, the mould-formed is produced using thermal sintering (preferably by laser) of materials such as that sold under the Registered Trademark Alumide®, and comprising a powdered composition of polyamide and powdered aluminium. The inventors have found that such a process and material produce a mould-former 6 that is particularly effective at resisting the temperatures required for vacuum forming the moulds 1.

The 3-D printing process may also be used to produce the support member 16 and the sealing member 17.

Following production 27 of the mould-former, the former may then be used to produce 28 the moulds 1 and the moulded items 21. The sealed, moulded items 21, still contained in their mould 1 may then be despatched to the client 29.

The invention claimed is:

1. A method of forming a molded item, said method comprising the steps of:
    (a) providing a mold former comprising an indentation having an inner surface and a bottom face and made of plastics and manufactured by a 3-dimensional printing process, said mold former being shaped to form a mold having:
        a series of holes extending between the inner surface and the bottom face of the mold former indentation,
    (b) forming the mold in said mold former from a plastics material, wherein the mold has an indentation corresponding to a desired shape of said molded item;
    (c) positioning an elongate member in and extending out of said mold such that a first end of the elongate member is received within said mold indentation and a second opposite end of said member is located outside said indentation;
    (d) introducing a volume of liquid into said indentation receiving said first end of said elongate member;
    (e) positioning a cover over said mold including said mold indentation receiving said first end of said elongate member and sealing the cover to the mold; and
    (f) causing said liquid in said covered mold indentation receiving said first end of said elongate member to solidify about said first end of said elongate member.

2. A method according to claim 1, wherein the 3-dimensional printing process is performed by means of fused deposition modelling (FDM) or fused filament fabrication (FFF).

3. A method according to claim 1, wherein the mold former is made of acrylonitrile-butadiene-styrene.

4. A method according to claim 1, wherein in step (b) a sheet of thermoplastic material is placed over the mold former (6) and a pressure differential is created at either side of the sheet while the sheet is heated above its softening point.

5. A method according to claim 1, wherein in step (e) said cover comprises a plastics film.

6. A method according to claim 5, wherein said cover further comprises a metal foil.

7. A method according to claim 4, wherein in step (e) said cover is sealed to said mold by plastics welding.

8. A method according to claim 1 wherein said cover is sealed to said mold adjacent the periphery of said indentation.

9. A method according to claim 1, wherein in step (f) said liquid is caused to solidify by means of a cooking process.

10. A method according to claim 1, wherein in step (f) said liquid is caused to solidify by means of a polymerisation reaction.

11. A method according to claim 1, wherein said elongate member is edible.

12. A method according to claim 1, wherein said elongate member is a wick.

13. A method according to claim 8 wherein said mold item is a frozen confection and wherein in step (f) said liquid is caused to solidify by means of freezing.

14. A method according to claim 9, wherein said mold item is a confection and wherein said liquid comprises molten chocolate and wherein in step (f) said liquid is caused to solidify by means of cooling.

15. A method according to claim 14, wherein said elongate member is formed of biscuit or hard candy.

16. A method according to claim 9, wherein said molded item is a bakery product and wherein said liquid comprises a cake or dough mix.

17. A method according to claim 16, wherein said elongate member is formed of biscuit or hard candy.

18. A method according to claim 8 wherein said molded item is a candle and wherein said liquid comprises molten candle wax and said elongate member comprises a wick.

* * * * *